United States Patent [19]

Rokhvarg

[11] 4,386,581
[45] Jun. 7, 1983

[54] ANIMAL BREEDING CONVEYOR HOUSE

[76] Inventor: Yakov Rokhvarg, 308 6th St., Fairview, N.J. 07022

[21] Appl. No.: 309,043

[22] Filed: Sep. 21, 1981

[51] Int. Cl.³ .................. A01K 1/12; A01K 1/00; A01K 1/01
[52] U.S. Cl. .................... 119/14.03; 119/16
[58] Field of Search .............. 119/16, 14.03, 14.04

[56] References Cited

U.S. PATENT DOCUMENTS

| | | | |
|---|---|---|---|
| 2,236,851 | 4/1941 | Haselton | 119/16 |
| 3,116,713 | 1/1964 | Darling | 119/14.04 |
| 3,261,324 | 7/1966 | Conover | 119/14.03 X |
| 4,254,736 | 3/1981 | Bohr | 119/14.03 |
| 4,269,145 | 5/1981 | Rokhvarg | 119/16 |

Primary Examiner—Hugh R. Chamblee
Attorney, Agent, or Firm—Ilya Zborovsky

[57] ABSTRACT

An animal breeding conveyor house has a stationary part and two independent conveyors of which one conveyor is a main conveyor and is formed as a spatial vertical frame, and the other is a secondary conveyor arranged so that said conveyor can rotate independently of or together with one another.

28 Claims, 15 Drawing Figures

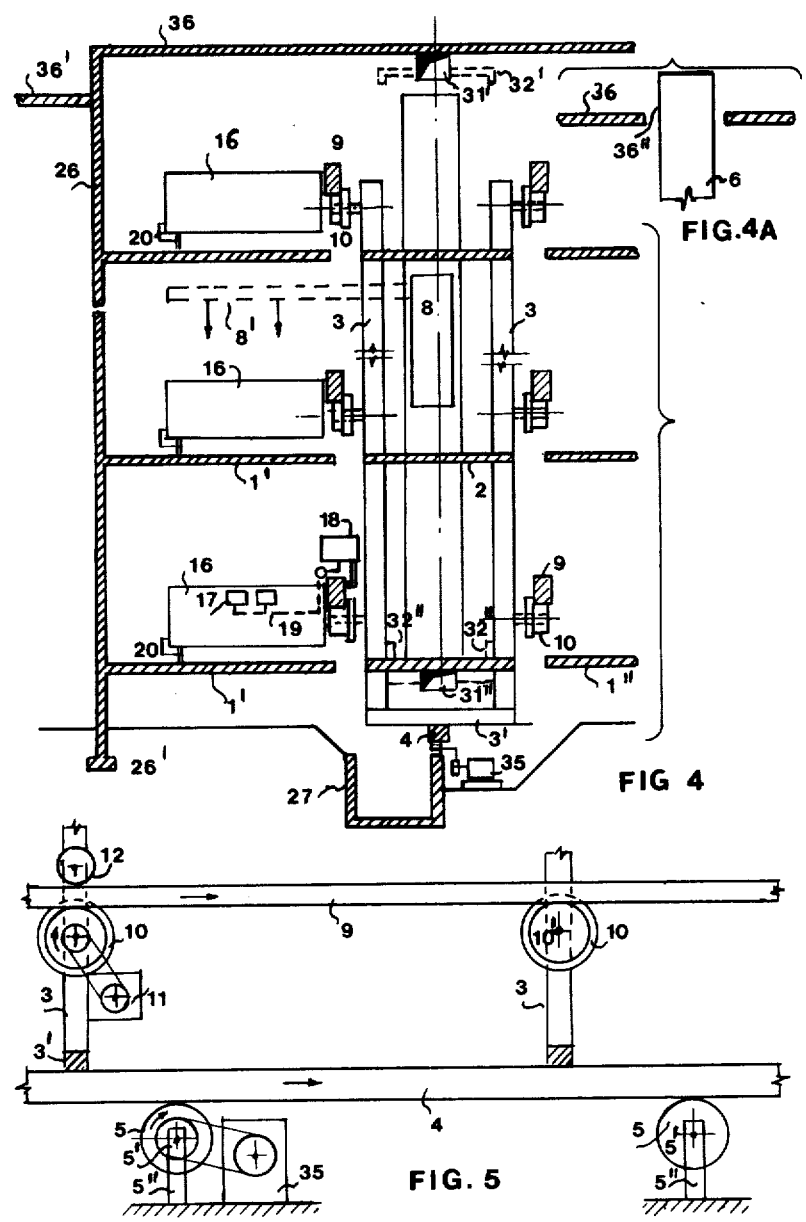

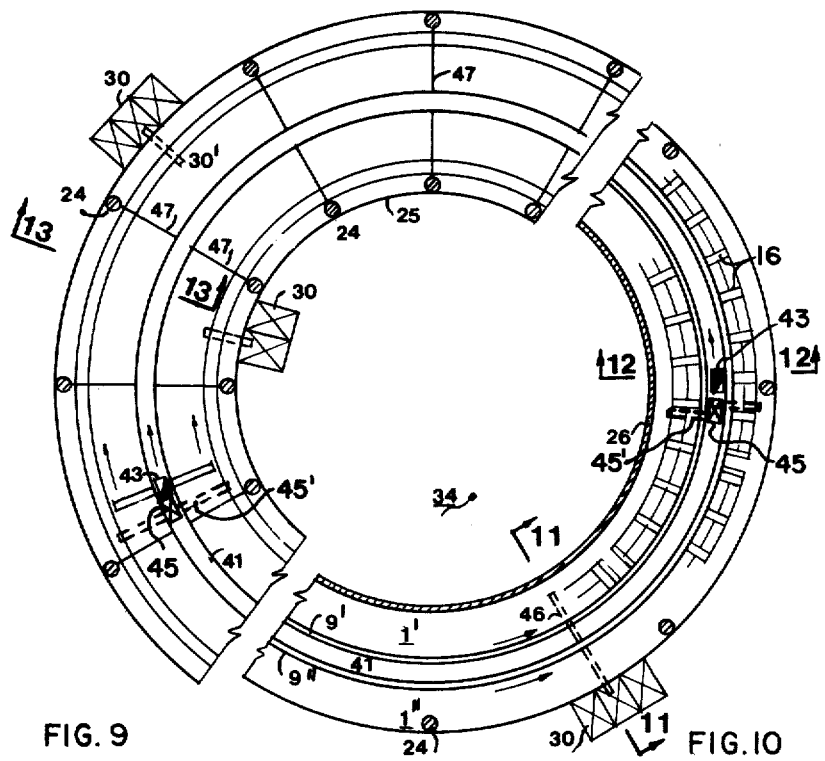
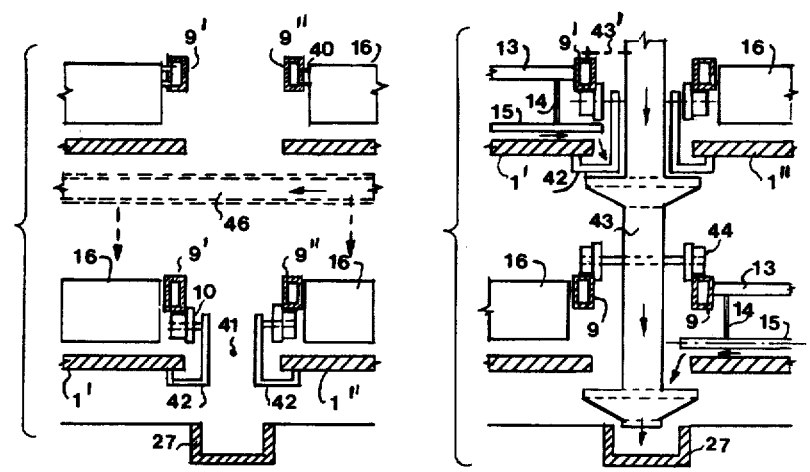
FIG. 9  FIG. 10
FIG. 11  FIG. 12

ANIMAL BREEDING CONVEYOR HOUSE

TECHNICAL FIELD

The present invention generally related to an animal house.

BACKGROUND ART

Animal houses, particularly multi-storied animal houses are known in the art. One of the animal houses is disclosed in the U.S. Pat. No. 4,269,145 of the inventor. The above-mentioned animal house has a plurality of stator members or floors located one above the other, and a plurality of rotor members provided with partitions and rotatable relative to the stator members. The partitions together with the stator members form a plurality of compartments, and when the rotor members with the partitions rotate, the latter urge the animals to move. In this construction all rotor members with the partitions either rotate or are immovable simultaneously for all stator members. Such a construction possesses, however, the disadvantage in the fact that identical processes must be performed simultaneously on all floors. This requires a great number of workers and high power of driving motors. In addition, simultaneous collection of liquid manure at each floor makes complicated and more expensive the process.

DISCLOSURE OF THE INVENTION

Accordingly, it is an object of the present invention to provide an animal house which avoids the disadvantages of the prior art.

More particularly, it is an object of the present invention to provide an animal house in which processes performed at various floors can be done both simultaneously and not simultaneously, and independently of one another in any desirable sequence.

In keeping with these objects and with others which will become apparent hereinafter, one feature of the present invention resides, briefly stated, in an animal house having a stationary part, a main conveyor and a secondary conveyor which can rotate independently of or together with one another.

BRIEF DESCRIPTION OF THE DRAWINGS

FIG. 4 is a view showing a section taken along the line 4—4 in FIG. 2;

FIG. 4a is a fragment of a ventilating gap in a roof of the animal house;

FIG. 5 is a view showing a section taken along the line 5—5 in FIG. 2;

FIGS. 9 and 10 are views showing other embodiments of the inventive animal house; and FIGS. 11-14 are views showing sections taken along the lines 11—11, 12—12, 13—13, and 14—14, respectively.

BEST MODE FOR CARRYING OUT OF THE INVENTION

Figure 1:
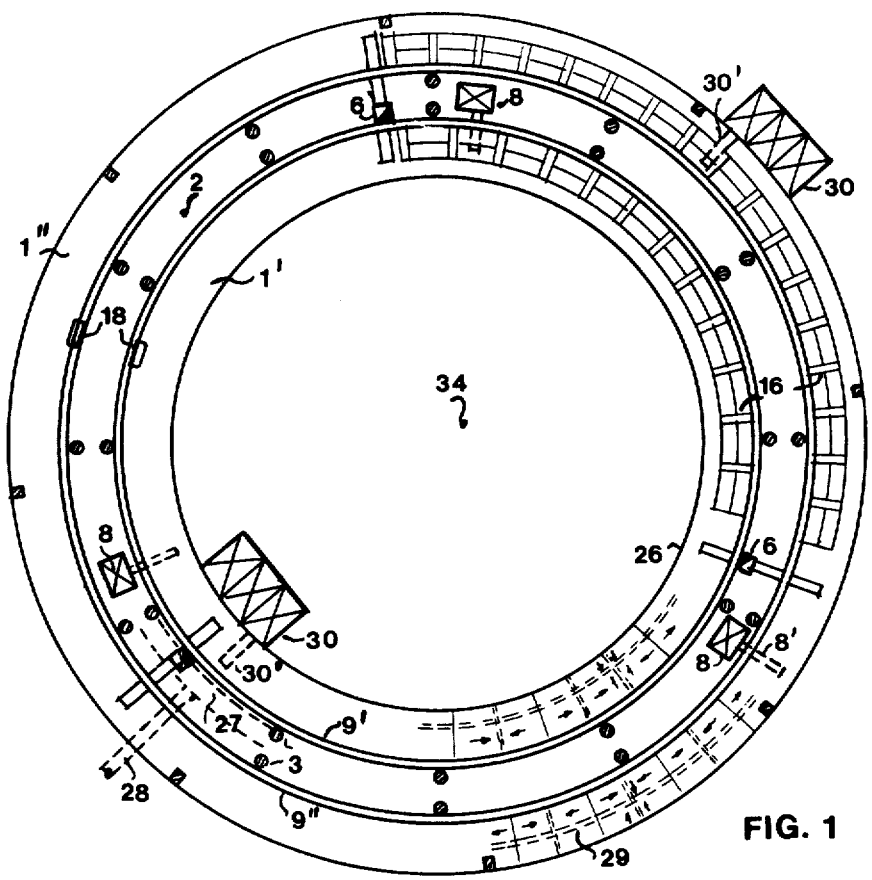
FIG. 1 is a plan view of an animal breeding conveyor house in accordance with the present invention.

An animal breeding conveyor house in accordance with the present invention has a plurality of stator elements forming floors for supporting animals, which are identified by reference numeral 1 and each has a radially inner portion 1' and a radially outer portion 1". The stator elements are spaced from one another in an upright direction and supported on columns 24 with foundations 24' thereabove as shown for outer portions or floors. As for the inner portions or floors, innermost walls 26 and foundations 26' are provided therefor.

Figure 14:
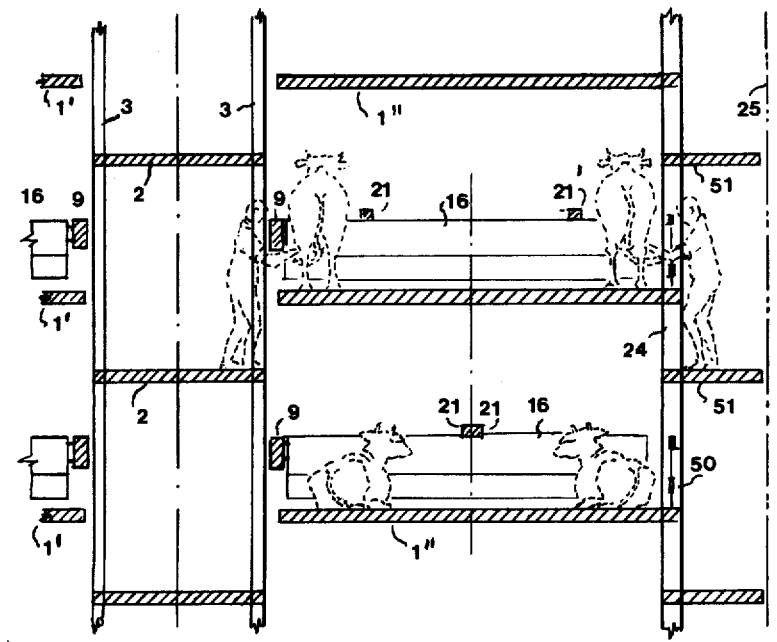

The outermost perimeter of the house has a light-permeable curtain wall 25. A similar wall may be provided also inside, and a solid wall may be provided outside. When it is necessary to provide a service platform below the level of animals' maintenance, floors are subdivided into two portions, and a servicing platform 51 with the column 24 therebetween are arranged (as shown in FIG. 14). In this case, tangential partitions 50 are provided which are fixed between the columns and secure the animals from falling down.

The inner and outer portions of the stator elements are radially spaced from one another so as to form a gap 41 therebetween. This gap is bridged by a roof 36 which is formed as a ring with the width from the outer to the inner wall. Reference numeral 34 identifies an inner space which is utilized as an auxiliary compartment for servicing purposes, for example for fodder preparation. A roof 36' can be provided above this part.

Figure 3:
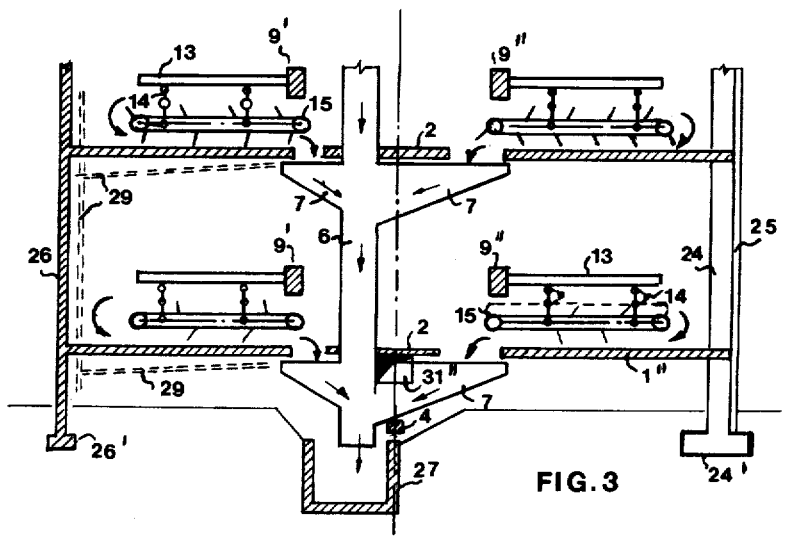
FIG. 3 is a view showing a section taken along the line 3—3 in FIG. 2.

The stator elements 1 are adjoined by shafts in which vertical elevators for animals, people or fodder supply 30 are arranged. A horizontal transporter 30' is further provided for supplying the fodder into bunks. The floors have a special draining system and slopes (as shown in FIGS. 1 and 3) for continuous withdrawal of animal urine and floor cleaning water but does not allow manure to drop into the gap before cleaning. FIG. 1 shows inclinations of the floors and pipes for continuous urine withdrawal 29. This makes possible to maintain the floors always in a relatively dry condition, with the exception of liquid manure whose cleaning will be described hereinbelow.

Intermediate platforms are arranged within the gap 41 and identified by reference numeral 2. However, it is not absolutely necessary to provide such a platform, as shown in FIGS. 9-13. A plurality of connecting elements including vertical connecting elements 3 and horizontal connecting elements 3' are further provided. The vertical connecting elements 3 extend over the entire height of the gap.

A main supporting annular rail of any shape in plan is identified as 4 and rests on the central supporting rollers 5. As shown in FIG. 5, the supporting rollers can rotate around an immovable axis 5' which is fixedly mounted by supports 5" on the foundation. A part of the supporting rollers 5 are driven in rotation by a motor 35. The rotation of the supporting rollers 5 is transmitted to the rail 4 located thereabove and fixedly connected with the horizontal 3' and vertical 3 connecting elements and platforms 2 so as to form a unitary spatial frame construction or so called main rotor element. The latter provides by its own weight, the rotation without slippage over.

A vertical liquid manure shaft 6 together with storey filling funnels 7 is mounted in the main rotor element and extends over the entire height of the gap. It also may extend into the ring-shaped ventilating gap 36" in the roof outwardly beyond the house as shown in FIG. 4a. The vertical dung shaft 6 moves over the center of a central annular liquid manure collecting chute 27 which is immovably supported on the ground. Liquid manure can be collected from the chute 27 with the aid of a pipe 28 or other means, for example into truck containers.

A feeder consisting of a vertical part 8 and a horizontal part 8' is also mounted in and extends over the entire height of the main rotor element.

The animal house has secondary annular rotary bars 9 including inner bars 9' and outer bars 9". Relative running rollers 10 cooperate with the bars 9. Some of the running rollers are connected with motors with a reduction gear 11. Pressing rollers 12 also cooperate with the bars 9. They are utilized for providing a required friction force for the rotation of the bars 9. The rollers 10 rotate around axes 10' which are fixed to the main rotor element described hereinabove, or fixedly to supports 42 (as shown in FIGS. 9-13) in the event when the intermediate platform 2 and respective connecting elements 3 are absent (as explained hereinabove) or form a small segment (a part of the annular main rotor) for supporting of the vertical dung shaft 6 and the feeder 8.

The function of the main rotor element can be performed separately by a movable dung shaft 43 and a feeder 45 having wheels 44. The latter move over the bar 9 (FIG. 12) or over immovable supporting radial rails 48 shown in FIG. 13 and located as a minimum at two levels of the house height. These rails are mounted with the aid of a beam 47 to the columns 24. When the connecting elements 3 are not provided, a horizontal transporter 46 for fodder supply into the bunks adjoins to a vertical fodder elevator 30 and can be formed movable and serve simultaneously for the floors 1' and 1", as shown in FIG. 11.

Reference numeral 13 identifies a supporting frame of the dung cleaning conveyor, which is rigidly connected to the bar 9. Reference numeral 14 identifies a device for pressing or raising the liquid manure cleaning conveyor 15 against the floor.

A plurality of radially spaced bunks 16 are attached to the bar 9 with the aid of movable mounting elements 40. At the other end, the bunks have supporting rollers 20 which support the edge of the bunk and roll over the surface of the floor or stator element. Central tangential partitions 21, outer tangential partitions 22 and hinges 23 for connecting the partitions to radial bunks and radial partitions provide for the formation of an individual compartment for each animal. The central tangential partition 21 can be formed of two parts 21' and 21" which can move to the periphery respectively, as shown in FIG. 14.

Figure 13:
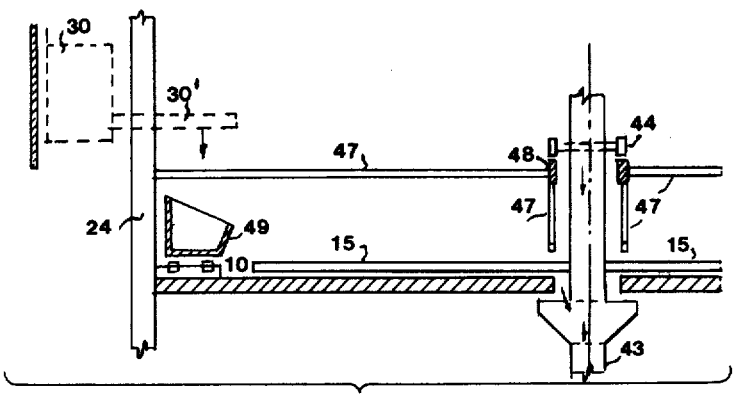

A plurality of automatic watering devices 17 are attached to the bunks in each compartment. Water is supplied from floor local reservoirs 18 via pipeline 19. The local reservoirs 18 are connected to the bar 9 and supplied with water from a central pipeline when the bar 9 is immovable. When the stator elements 1' and 1" are subdivided into large compartments for free maintenance of animals, an annular bunk 49 can be provided and move over the supporting rollers 10, as shown in FIG. 13.

The animal house is provided with a ventilation system. Spent air as a vapor is removed via an aspirating gap in the roof 36" as shown in FIG. 4a, or with the aid of an annular box of aspirating ventilation 31' with pipes for expanding of action zone 32'. For withdrawal of spent gases which are heavier than air, such as ammonia, an aspirating ventilation formed as a box 31" with pipes 32" is also provided in a respective part of the animal house. Air is aspirated by a ventilator 33. Fresh air is supplied via gaps in the walls 25 or windows 26. Elements 37, 38 and 39 are elements of control of processes in the animal house, as will be explained hereinbelow.

The animal breeding conveyor house in accordance with the invention operates in the following manner.

As mentioned above, the rotary bars located above each floor element at both sides of the gap and supported on the rotatable rollers connected to the connecting elements of the main rotor element form together with the bunks 16 and partitions 21, 22 and 13 individual compartments for maintenance of animals during a predetermined long time. The maintenance time depends, for example, upon the age of animals. When animals become older, they can be moved to another floor with larger compartments, or the size of the compartments can be increased by displacement of the bunks over the bar 9 and utilization of the movable mounting elements 40. As a rule, animals placed in early age into compartments will spend the remaining part of their life without leaving the animal house.

The horizontal liquid manure cleaning conveyor 15 may also be connected with the bar 9. Other equipment, such as a machine for washing floors and wiping the same and so on, may also be attached to the bar 9. All above mentioned elements attached to the bar 9, together with animals located within these constructions, and rotatable as described, form a secondary breeding conveyor connected on each floor to the main rotor element. As mentioned above, the main rotor element is a structure which is located and rotates in the gap between the portions of the floor elements, with attached equipment for cleaning of liquid manure and distribution of fodder into the bunks. This is a main servicing conveyor in the technological sense.

Figures 6, 7, 8:
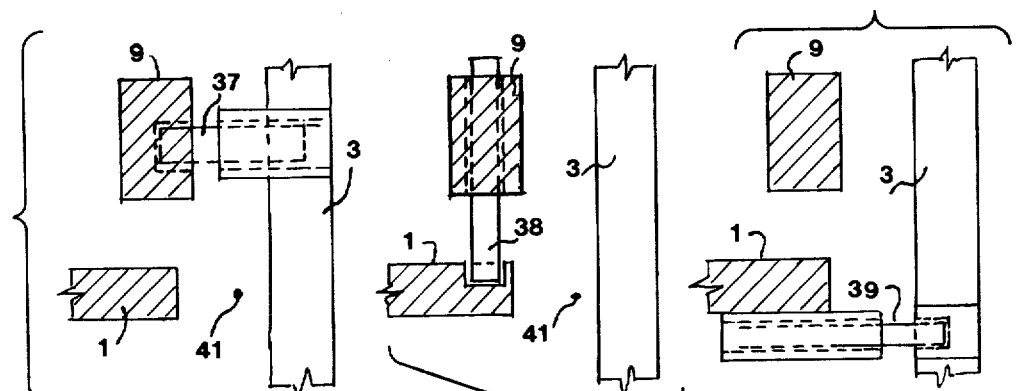
FIGS. 6, 7 and 8 are views showing different positions of a rotary element of the animal house.

When the secondary conveyor is connected with the servicing conveyor 3 by the connecting element 37 (FIG. 6), the entire system is driven in rotation by the motor 35. Thus, the operations of walking of animals, liquid manure collection, fodder distribution into the bunks from the stationary fodder distribution 30 take place. Animals are urged to move and therefore they form a part of the movable breeding conveyor. After experimental determination of movement speed of the breeding conveyor and time of movement thereof for the best productivity, data are provided for programming of the process of controlling the process by a computer.

When it is necessary to collect liquid manure, the device 14 presses the conveyor 15 against the floor, and then the conveyor 15 is driven to supply liquid manure into the shaft 6 via which it is supplied to the element 27. When during the animal walking it is not necessary to remove liquid manure, the conveyor is raised and turned off. When it is necessary to distribute the fodder during animal walking, for example for stimulating the movement, the fodder is supplied into the bunks from the stationary transporters 30' when the bunks pass below the same. During the movement the partition 21 (FIG. 14) can be moved to the periphery so as to reduce the width of the compartment which is necessary for walking cows, venterinary care, etc.

When the secondary (breeding) conveyor 9 is connected with the stator 1 on a particular floor (FIG. 7), animals are in rest condition. The motor 35 drives into movement the servicing conveyor which rotates relative to the immovable annular bar 9 because of the rotation of the relative running rollers 10. The liquid manure collecting conveyor 15 is in its raised position above the floor, and since it is not connected with the shaft 6, they are disconnected in the plane during the movement of the servicing conveyor. This is, however, performed with the necessary condition of returning into initial position after the termination of the rotation. The feeder 8' displaces over the circumference and supplies the folder into the bunks. At the same time, the cleaning of manure is also possible by another horizontal transporter directly connected to the vertical shaft. During slow movement, the resting animals walk over this transporter.

When the servicing conveyor 3 is connected to the stator 1 by the connecting element 39 (FIG. 8), the breeding conveyor 9 of each floor can rotate individually by turning one of its own individual motors 11. In this case, walking of the animals, distribution of fodder from the stationary fodder distributors 30 and 30' into the periodically approaching bunks 16 take place. When the animal house is modified as shown in FIGS. 10–12, during the individual rotation of the breeding conveyor the liquid manure can be collected into the vertical shaft 43 which has attaching means 43' to the bar 9 at the location of the liquid manure conveyor 15.

Figure 2:
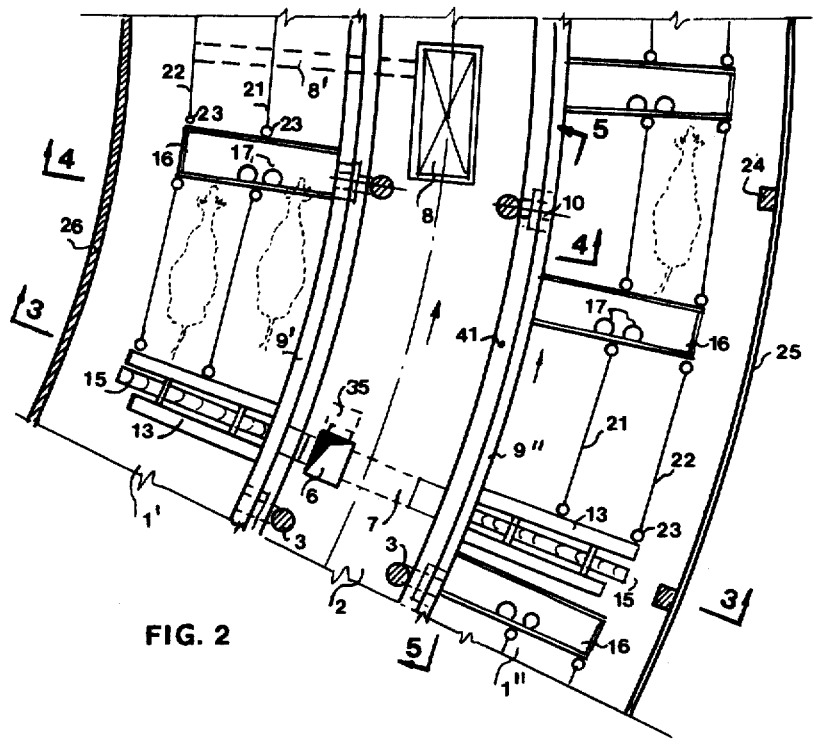
FIG. 2 is a fragment of the plan view shown in FIG. 1 on an enlarged scale.

Arrows are utilized in the drawings to show the directions of various processes which take place in the inventive animal breeding conveyor house. FIG. 1 shows a system of draining, and the arrows identifying inclinations of the floor and direction of water removal. The arrows in FIG. 2 show the independent movement of the rotor and the movement of the bar 9 which is independent therefrom. The arrows in FIG. 3 show the direction of movement of the horizontal dung collecting conveyors 15 and the direction of displacement of dung. FIG. 4 shows the distribution of the fodder. FIG. 5 shows the direction of movement of the driving rollers which are driven from the motor and guide the movement of the elements 4 and 9. FIG. 9 illustrates the direction of movement of the dung collecting shaft and the conveyors. FIG. 10 shows the direction of movement of the liquid manure collecting shaft and the direction of movement of the bar 9.

The animal house designed in accordance with the present invention makes possible not only the movement of the entire multi-storied system as a whole, but also the movements of individual floors for animals. The system may work automatically from a computer for a computerized operation of all processes in accordance with a desired program.

The invention is not limited to the details shown since various modifications and structural changes are possible in the present invention without departing in any way from the spirit of the inventive animal house. What is desired to be protected by Letters Patent is set forth in the appended claims.

I claim:

1. An animal breeding conveyor house, comprising a stationary part including radially inner and radially outer stationary annular elements spaced from one another so as to form a gap therebetween and each formed by a plurality of immovable annular plane members spaced from one another in an upright direction and connected with one another;

a main service conveyor including a plurality of plane rotary platforms located in said gap and also spaced from one another in the upright direction and connected with one another so as to form a unitary upright spatial frame;

means for rotating said frame and thereby said main service conveyor relative to said stationary part;

first feed distributing means cooperating with said main service conveyor so that when the latter rotates said first feed distributing means distributes the food;

first liquids manure cleaning means cooperating with the main service conveyor so that when the latter rotates said first liquid manure cleaning means cleans the liquid manure.

a secondary conveyor including a plurality of pairs of annular rotary bars spaced from one another in the upright direction, each rotary bar of each of said pairs carrying a plurality of radial partitions associated with a respective one of said immovable annular plane members and forming a plurality of animal accommodating compartments so that when said secondary conveyor with said platforms rotates the animals accommodated in said compartments are urged to move;

a plurality of further means for rotating each of said rotary bars independently of other of said rotary bars together with the respective plurality of radial partitions;

second feed distributing means arranged so that when at least one of said bars with the respective plurality of partitions rotates, at least one of said first and second feed distributing means distributes the food;

second liquid manure cleaning means;

connecting means for connecting said main conveyor with at least one of said bars so that when said first mentioned rotating means rotates said main conveyor, the latter rotates said one bar with the respective partitions so that they rotate together, said second feed distributing means distributes the food and said second liquid manure cleaning means cleans the liquid manure.

2. An animal breeding conveyor house as defined in claim 1; and further comprising second connecting means arranged to connect each of said bars of said secondary conveyor to said stationary part so as to make the former immovable during rotation of said main conveyor.

3. An animal breeding conveyor house as defined in claim 1; and further comprising third connecting means arranged to connect said main conveyor with said stationary part so as to make the former immovable during rotation of said bars of said secondary conveyor.

4. An animal breeding conveyor house as defined in claim 1; wherein said first mentioned rotating means includes a plurality of rotatable rollers arranged to frictionally support said main conveyor, and means for rotating said rollers so that when at least one of said rollers is rotated said main conveyor is driven in rotation.

5. An animal breeding conveyor house as defined in claim 1, wherein said immovable annular plane members of each of said stationary elements of said stationary part are connected with one another by upright connecting columns.

6. An animal breeding conveyor house as defined in claim 1, wherein said immovable annular plane members of each of said stationary elements of said stationary part are connected with one another by upright connecting walls.

7. An animal breeding conveyor house as defined in claim 1, and further comprising a light-permeable curtain wall surrounding at least one of radially inward and radially outward sides of said stationary elements for protective purposes.

8. An animal breeding conveyor house as defined in claim 1, and further comprising a liquid manure chute located in said gap in its lower region.

9. An animal breeding conveyor house as defined in claim 1, wherein said second feed distributing means is formed as a vertically movable transporting element arranged to transport not only the food but also people and animals.

10. An animal breeding conveyor house as defined in claim 1, wherein said liquid manure cleaning means includes a vertical shaft with a plurality of funnels at the level of each of said immovable annular plane members of said stationary part.

11. An animal breeding conveyor house as defined in claim 1, wherein said further rotating means includes a plurality of relative rotatable rollers arranged to frictionally support each of said bars, and drive means arranged to rotate at least one of said relative rotatable rollers so as to thereby rotate the respective one of said bars.

12. An animal breeding conveyor house as defined in claim 11, wherein said further rotating means also includes a plurality of pressing rollers arranged to press a respective one of said bars to the respective ones of said rollers.

13. An animal breeding conveyor house as defined in claim 11, wherein said relative rotatable rollers have axes mounted on said main rotary conveyor.

14. An animal breeding conveyor house as defined in claim 11, wherein said relative rotatable rollers have axes mounted on said stationary part.

15. An animal breeding conveyor house as defined in claim 1, wherein said radial partitions mounted on said bars are formed as bunks.

16. An animal breeding conveyor house as defined in claim 1, and further comprising a plurality of detachable tangential partitions each subdividing the respective compartments into at least two partial compartments.

17. An animal breeding conveyor house as defined in claim 16, wherein each of said tangential partitions is composed of two parts displaceable in a radial direction so as to change the size of said partial compartments.

18. An animal breeding conveyor house as defined in claim 10, wherein said first liquid manure cleaning means also includes a plurality of horizontal transporters spaced from one another in the upright direction and each connected with said vertical shaft and extending in said compartments to clean the liquid manure during rotation of said main conveyor, under animal standing in the compartments.

19. An animal breeding conveyor house as defined in claim 10, wherein said second liquid manure cleaning means includes a plurality of further transporters connected with said bars and extending above said immovable annular members so as to clean the liquid manure at locations free of animals accommodated in the compartments.

20. An animal breeding conveyor house as defined in claim 19, wherein each of said further transporters are vertically movable between a lower operative position in which they clean the liquid manure and an upper inoperative position in which they do not clean the same.

21. An animal breeding conveyor house as defined in claim 1, wherein each of said immovable annular plane members of said stationary part has a first annular zone over which said partitions extend and in which the animal accommodating compartments are formed, and a second radially spaced annular zone free from said partitions and arranged for servicing purposes.

22. An animal breeding conveyor house as defined in claim 21, wherein said second annular zone is offset from said first annular zone in the upright direction.

23. An animal breeding conveyor house as defined in claim 1, wherein each of the said immovable annular plane members of said stationary part has at least one inclined portion connected with draining means and arranged so as to withdraw urine and retain the manure.

24. An animal breeding conveyor house as defined in claim 1, wherein said stationary annular elements of said stationary part bound inwardly a space formed as a storage space and provided with a roof members covering said space from above.

25. An animal breeding conveyor house as defined in claim 1, and further comprising a system of ventilation including annular upper and lower ventilating boxes spaced from one another in the upright direction and connected with aspirating pipes.

26. An animal breeding conveyor house as defined in claim 1, and further comprising a roof and an annular ventilating opening provided in said roof.

27. An animal breeding conveyor house as defined in claim 1, and further comprising an automatic drinker associated with a respective one of bunks for animals.

28. An animal breeding conveyor house as defined in claim 1, and further comprising water supply means formed as each floor supply means and including a water tank mounted on said secondary conveyor.

* * * * *